Figure 1:
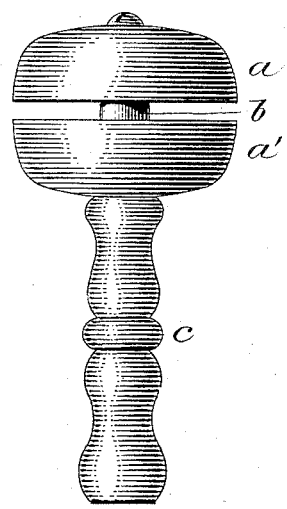

(No Model.)

J. L. WATROUS.
BELL.

No. 436,448. Patented Sept. 16, 1890.

Witnesses:
Emmet B Rich
David W Watrous

Inventor.
John L. Watrous ns in the
UNITED STATES PATENT OFFICE.

JOHN L. WATROUS, OF EAST HAMPTON, CONNECTICUT.

BELL.

SPECIFICATION forming part of Letters Patent No. 436,448, dated September 16, 1890.

Application filed June 16, 1890. Serial No. 355,586. (No model.)

*To all whom it may concern:*

Be it known that I, JOHN L. WATROUS, a citizen of the United States, residing at East Hampton, in the county of Middlesex and State of Connecticut, have invented a new and useful Improvement in Bells, of which the following is a specification.

My invention relates to improvements in the construction of bells, and has for its object to produce an inexpensive yet durable and attractive bell. I attain this object by making the bell as shown in the drawings.

Figure 2:
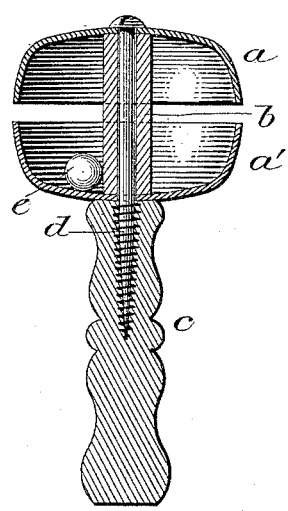
Figure 3:
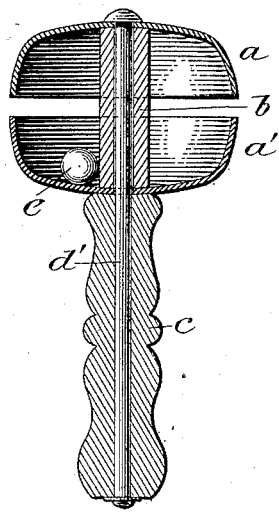
Figure 4:
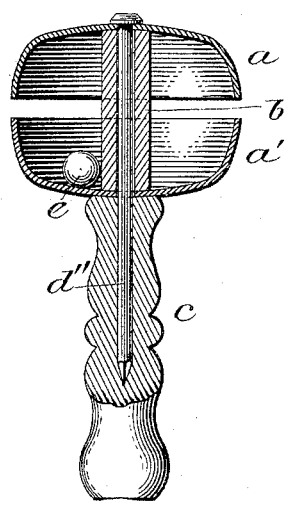

Figure 1 is a view of the bell complete. Fig. 2 is a sectional view. Figs. 3 and 4 are views of modifications.

$a\ a$ are two gongs placed mouth to mouth.

$b$ is a piece of tubing placed between the bells to hold them at a certain distance apart.

$c$ is the handle. $d$ is a screw, or, as shown in Figs. 3 and 4, may be a rivet $d'$ or a nail $d''$, which passes through both bells and the tubing and into or through the handle and holds them all together, as shown.

$e$ is the jinglet, placed within the bell.

It will be seen that one important feature in this construction is that the handle serves both as a handle and a nut. The handle is generally made of wood, so that there is no necessity of cutting any screw-threads in the nut, whereas if the rivet were made integral with the handle a thread would have to be cut on the other end of the rivet and a nut threaded to fit. Besides this, there is no soldering nor any work requiring skilled labor in making the bell.

Having thus described my invention, what I desire to claim is—

1. The combination of two bells placed mouth to mouth, a jinglet, a piece of tubing placed between the bells of sufficient length to hold the bells apart, a handle, and a fastener which passes through both bells and the tubing and into the handle, to which it is fastened so as to hold all the parts together, substantially as described.

2. The combination of a handle, two bells placed mouth to mouth, a tube of sufficient length to hold the bells apart, said tube being placed between the bells, a screw passing through both bells and the tube and screwing into the handle, whereby the handle also serves as a nut, and a jinglet, substantially as described.

JOHN L. WATROUS.

Witnesses:
 EMMET B. RICH,
 DAVID W. WATROUS.